(12) United States Patent
Rajagopalan et al.

(10) Patent No.: US 7,897,670 B2
(45) Date of Patent: *Mar. 1, 2011

(54) GOLF BALL FORMED FROM A POLY-(DIMETHYL SILOXANE) IONOMER

(75) Inventors: Murali Rajagopalan, South Dartmouth, MA (US); Michael J. Sullivan, Barrington, RI (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/102,048

(22) Filed: Apr. 14, 2008

(65) Prior Publication Data

US 2009/0258729 A1 Oct. 15, 2009

(51) Int. Cl.
 A63B 37/00 (2006.01)
 A63B 37/12 (2006.01)
 C08G 77/398 (2006.01)

(52) U.S. Cl. ............... 524/322; 524/394; 524/397; 525/474; 525/477; 528/35; 528/41; 473/371; 473/372; 473/373; 473/378; 473/385

(58) Field of Classification Search ............ None
See application file for complete search history.

(56) References Cited

U.S. PATENT DOCUMENTS

| | | | |
|---|---|---|---|
| 5,006,297 A | 4/1991 | Brown | |
| 5,334,673 A | 8/1994 | Wu | |
| 5,484,870 A | 1/1996 | Wu | |
| 5,504,233 A | 4/1996 | Bindl et al. | |
| 5,669,831 A * | 9/1997 | Lutz | 473/377 |
| 5,692,974 A | 12/1997 | Wu et al. | |
| 5,733,428 A | 3/1998 | Calabria et al. | |
| 5,885,172 A | 3/1999 | Hebert et al. | |
| 6,149,535 A | 11/2000 | Bissonnette et al. | |
| 6,152,834 A | 11/2000 | Sullivan | |
| 6,162,135 A | 12/2000 | Bulpett et al. | |
| 6,180,722 B1 | 1/2001 | Dalton et al. | |
| 6,207,784 B1 * | 3/2001 | Rajagopalan | 528/71 |
| 6,235,830 B1 | 5/2001 | Ohmori et al. | |
| 6,245,862 B1 * | 6/2001 | Rajagopalan | 525/340 |
| 6,291,592 B1 | 9/2001 | Bulpett et al. | |
| 6,458,895 B1 | 10/2002 | Wrigley et al. | |
| 6,919,395 B2 | 7/2005 | Rajagopalan et al. | |
| 2002/0187858 A1 * | 12/2002 | Morgan et al. | 473/374 |
| 2005/0272899 A1 * | 12/2005 | Wu | 528/44 |
| 2009/0258728 A1 * | 10/2009 | Rajagopalan et al. | 473/373 |

OTHER PUBLICATIONS

Lei, Novel Sulphonated Polysiloxane Polyurea-Urethane Ionomers; Chinese Journal of Polymer Science vol. 14 No. 4; 1996.*
Ashish Batra, Clause Cohen, and T. M. Duncan, Synthesis and Rheology of Tailored Poly(dimethylsiloxane)Zinc and Sodium Ionomer, 2006, pp. 426-438, vol. 39, Macromolecules, Columbus, OH 43210.

* cited by examiner

*Primary Examiner*—David Buttner
(74) *Attorney, Agent, or Firm*—D. Michael Burns

(57) ABSTRACT

A golf ball comprising a core and a cover layer, wherein at least one of the core or cover layer comprises homo and copolymers of poly(dimethyl siloxane) ionomers, and their blends for improved resiliency and abrasion resistant golf balls.

14 Claims, No Drawings

GOLF BALL FORMED FROM A POLY-(DIMETHYL SILOXANE) IONOMER

CROSS-REFERENCE TO RELATED APPLICATIONS

This application is co-pending with U.S. patent application Ser. No. 12/102,076, filed Apr. 14, 2008. The disclosure of which is incorporated by reference herein in its entirety.

FIELD OF THE INVENTION

The present invention relates to a golf ball and, more particularly, a golf ball outer core layer that is formed of a composition comprising homo and copolymers of poly(dimethyl siloxane) ionomers, and their blends for improved resiliency and abrasion resistant of golf balls.

BACKGROUND OF THE INVENTION

Golf balls can generally be divided into two classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric material, and a cover. Solid balls have traditionally been considered longer and more durable than wound balls, but also lack the particular "feel" that is provided by the wound construction and typically preferred by accomplished golfers.

By altering ball construction and composition, however, manufacturers can vary a wide range of playing characteristics, such as resilience, durability, spin, and "feel," each of which can be optimized for various playing abilities, allowing solid golf balls to provide feel characteristics more like their wound predecessors. The golf ball components, in particular, that many manufacturers continually look to improve are the center or core, intermediate layers, if present, and covers.

The core is the "engine" of the golf ball when hit with a club head. Generally, golf ball cores and/or centers are constructed with a polybutadiene-based polymer composition. Compositions of this type are constantly being altered in an effort to provide a targeted or desired coefficient of restitution ("COR") while at the same time resulting in a lower compression which, in turn, can lower the golf ball spin rate, provide better "feel," or both. This is a difficult task, however, given the physical limitations of currently-available polymers.

Manufacturers also address the properties and construction of golf ball intermediate and cover layers. These layers have conventionally been formed of ionomer materials and ionomer blends of varying hardness and flexural moduli. This hardness range is still limited and even the softest blends suffer from a "plastic" feel according to some golfers. Recently, however, polyurethane-based materials have been employed in golf ball layers and, in particular, outer cover layers, due to their softer "feel" characteristics without loss in resiliency and/or durability.

One conventional material that has been used to form golf ball covers is balata, a natural or synthetic trans-polyisoprene rubber. The softness of the balata cover allows the player to achieve spin rates sufficient to more precisely control ball direction and distance, particularly on shorter shots. However, balata covers lack the durability required by the average golfer, and thus are easily damaged. Accordingly, alternative cover compositions have been developed in an attempt to provide balls with spin rates and a feel approaching those of balata covered balls, while also providing a golf ball with a higher durability and overall distance.

Ionomer resins (e.g., copolymers of olefin, such as ethylene, and ethylenically unsaturated carboxylic acids, such as (meth)acrylic acids, wherein the acid groups are partially or fully neutralized by metal ions) have also been used as golf ball cover materials. Ionomer covers may be virtually cut-proof, but in comparison to balata covers, they display inferior spin and feel properties.

Thermoplastic materials are used in golf ball applications, particularly because they are easy to implement and have high performance qualities at ambient temperature. They are also flexible and have a high degree of mechanical resistance. Nevertheless, thermoplastic materials have the drawback of low physical resistance to heat such that the products obtained from said materials have, depending on their use, a short service life. On the other hand, materials known as "thermosetting" materials are difficult to shape, thus even though they may be heat resistant, their use is limited.

Methods have been formulated to form thermoset polyurethane and polyurea materials for use in golf balls. In order to achieve this, the preparation of a thermosetting polymer has been proposed by modifying easily processed thermoplastic polymers to enable the finished product to be cross-linked. One popular method is the reaction of thermoplastic polyurethane or polyurea compositions with a toxic isocyanate monomer like MDI or TDI to create a cross-linking moiety. This is usually achieved by achieved by mixing and extruding a polymer, particularly a polyethylene with a peroxide. However, this type of method not only has the drawback of being possible with only a limited number of polyethylenes, but also of requiring very expensive industrial installations.

Other methods include the use of a high energy radiation to produce a cross-linked TPU, such as irradiating a polymer with doses measuring 80 to 200 KGy. It should, however, be noted that this type of treatment is very expensive and also tends to deteriorate rather than improve the polymers used.

Hebert, et al., U.S. Pat. No. 5,885,172 ("the '172 patent") discloses a multilayer golf ball giving a "progressive performance" (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane as described in Wu, et al., U.S. Pat. No. 5,692,974, or thermoset polyurethanes such as TDI or methylenebis-(4-cyclohexyl isocyanate) ("HMDI"), or a polyol cured with a polyamine (e.g. methylenedianiline (MDA)), or with a tri-functional glycol (e.g., N,N,N',N'-tetrakis(2-hydroxypropyl) ethylenediamine). The '172 also provides that the inner cover has a Shore D hardness of 65 80, a flexural modulus of at least about 65,000 psi, and a thickness of about 0.020 0.045 inches. Exemplary materials for the inner cover are ionomers, polyurethanes, polyetheresters (e.g. HYTREL®), polyetheramides (e.g., PEBAX®), polyesters, dynamically vulcanized elastomers, functionalized styrene-butadiene elastomer, metallocene polymer, blends of these materials, nylon or acrylonitrile-butadiene-styrene copolymer.

Therefore, a continuing need remains for novel golf ball construction, and particularly for a golf ball cover that has the desirable and/or optimal combination of performance characteristics, while also having good abrasion durability, feel, and friction characteristics that result in favorable spin. The present invention is directed to golf balls having components formed of novel poly(dimethyl siloxane) (PDMS) ionomers.

SUMMARY OF THE INVENTION

The present invention is directed to a golf ball comprising a core and at least one cover layer, wherein at least one of the core or cover layer comprises a composition that includes a poly(dimethyl siloxane) ionomer, wherein the poly(dimethy siloxane) ionomer is made by the steps of: polycondensating hydroxyl terminated poly(dimethyl siloxane) chains with a dicholoro silane compound; cleaving of a tert-butyl group using triflic acid catalyst; and neutralizing the acid moiety in the polymer either partially or fully with a suitable metal salt selected from the group consisting of lithium hydroxide, sodium hydroxide, zinc acetate or magnesium oxide.

According to this invention, the triflic acid content is from 2 to 3 micro-liter per 10 grams of the polymer. The acid content in the polymer is from 5 to 50 wt. %. Flow modifiers are used to achieve high neutralization levels of 70 to 100 percent. The flow modifiers are fatty acid salts or non-fatty acid salts, wherein the fatty acid-modified poly(dimethyl siloxane) ionomer is made at least in part by neutralizing the poly(dimethyl siloxane) ionomer with an inorganic metal cation and post-blended with a fatty acid or a fatty acid salt, wherein the fatty acid is selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, .gamma.-linolenic acid, .alpha.-linolenic acid, stearidonic acid, dihomo-gamma-linolenic acid, arachidonic acid, timnodonic acid, clupandonic acid, dimers, trimers and mixtures thereof.

In one embodiment of this invention, the fatty acid or salt thereof is present in an amount sufficient to neutralize the ionomers by at least about 90%. In a preferred embodiment, the fatty acid or salt thereof is present in an amount sufficient to neutralize the ionomers by about 100%. Metal cations that can be used are barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

The present invention is directed to a golf ball comprising a core and at least one cover layer, which may include a outer core layer, and/or an intermediate layer, and/or an inner cover layer, wherein at least one of the layers comprises a poly (dimethyl siloxane) ionomer that has a thickness of less than about 0.05 inches.

DETAILED DESCRIPTION OF THE INVENTION

The golf balls of the present invention may comprise any of a variety of constructions, from a simple one-piece solid ball, to a two-piece ball formed of a core and cover, to a three piece dual core single cover, to any multi-piece construction having at least a core, one outer core layer and a cover formed of an outer cover layer and at least one inner cover layer. The core and/or the cover layers may be formed of more than one layer and an intermediate or mantle layer may be disposed between the core and the cover of the golf ball. The innermost portion of the core, while preferably solid, may be a hollow or a liquid-, gel-, or air-filled sphere. As with the core, the cover layers may also comprise a plurality of layers, at least one of which may be an adhesive or coupling layer. The layers may be continuous or non-continuous (i.e., grid-like). The core may also comprise a solid or liquid filled center around which many yards of a tensioned elastomeric material are wound.

Any of the core, intermediate layers, or cover components may be formed of or include poly(dimetyl siloxane) (PDMS) ionomers and their blends. Components include golf ball centers, cores, layers, covers, and coating materials and/or blends. The poly(dimetyl siloxane) ionomers can be produced by direct modification of PDMS backbone with functional moieties; ring opening polymerization of functional cyclosiloxanes; and polycondensation of bisilafunctional monomers.

The PDMS ionomers used in the present invention are made by the following steps: synthesis of low poly-dispersity hydroxyl terminated PDMS chains; synthesis of dichloro silane compound; synthesis of PDMS with a tert-butyl group by the polycondensation of hydroxyl terminated PDMS chains with a dicholoro silane compound; and synthesis of PDMS ionomer by the cleavage of tert-butyl group using an appropriate amount of triflic acid catalyst (from 2 to 3 micro-liter per 10 grams of polymer) followed by neutralizing the acid moiety in the polymer either partially or fully with suitable metal salts like lithium hydroxide, sodium hydroxide, zinc acetate, or magnesium oxide. The neutralization from about 30 to 100 weight percent, preferably from 40 to 60 weight percent, and more preferably 80 to 100 weight percent.

The first step in the synthesis of poly(dimethylsiloxane) ionomer is the synthesis of low-polydispersity hydroxyl-terminated PDMS chains, as discussed in Batra[1] (Ashish Batra, Claude Cohen, and T. M. Duncan, Macromolecules, Synthesis and Rheology of Tailored Poly(dimethylsiloxane) Zinc and Sodium Ionomer, Vol. 39, pp. 426-438, 2006), These were synthesized from hexa-methylcyclotrisiloxane ($D_3$) monomer by anionic ring-opening polermization in a 50 wt % toluene solution at 60° C. catalyzed by benzyltrimethylammoniumbis(ó-phenylenedioxy)-phenylsiliconate) and promoted by dimethyl sulfoxide (DMSO). Calculated amounts of water are added to control the molecular weight of the resulting polymer.

Step two is the synthesis of a dichlorosilane compound containing a protected carboxylic acid group. Methyldichlorosilane is hydro-silylated (a Si—H group adds to a carbon-carbon double bond) with tert-butyl acrylate in the presence of a catalyst, cis-dichlorobis(dimethyl sulfide) platinum (II), at 45° C. The product is a mixture of the anti-Markovnikov and Markovnikov addition products.

Step three is the synthesis of polymer chains by polycondensation of precursor PDMS chains and the dichlorosilane compound. To a 10 wt % solution of an OH-terminated PDMS in toluene, a 20% excess of the small molecule dissolved in toluene is added at a very slow rate using a syringe pump. The reaction mixture also contains 1 wt % pyridine that acts as an acid scavenger for the HCl released during the polycondensation. Very slow addition yields a higher degree of poly-condensation as compared to fast addition. The poly-condensation varies with the molecular weight of the PDMS precursors. Additional procedures are discussed in Batra[1].

Step four involves the cleavage of the tert-butyl group. This is a critical step in the synthesis because of the fragility of the PDMS backbone. Acids such as trifluoroacetic acid, formic acid, p-toluenesulfonic acid, and nitric acid can break backbone chains if used in high concentrations to achieve 100% cleavage. The hydrophobic nature of the siloxane backbone prevents use of some schemes used for small molecule deprotection. A scheme proposed in U.S. Pat. No. 5,504,233 uses acids such as tert-butyl groups and obtains cleavage at lower temperatures, i.e. adding triflic acid to a 10 wt % solution of the polycondensed product in the presence of toluene and a heat of 120° C. Such low quantities of triflic acid act as a catalyst in reducing the cleavage temperature of the tert-butyl groups from 210 to 105° C. Caution is taken in that too much triflic acid can break the PDMS backbone, and too little does not cleave the tert-butyl groups.

In step five the triflic acid is neutralized with sodium bicarbonate. The tert-butyl is cleaved and an ionomer created by filtrating the sodium bicarbonate out of the solution and what remains is then diluted to a 5 wt % solution in toluene. A 100% excess of zinc(ii), sodium, or cobalt(II)acetylacetonate is added to the solution and ionomers are created after fractionation with methanol.

In the present invention, PDMS ionomers can be either as is or can be blended with other thermoplastic materials like ionomers, highly neutralized polymers such as HPF® from DuPont, engineering thermoplastic materials like polyester/polycarbonate, polyamide, polyester, thermoplastic urethanes, as well as thermoplastic elastomers like poly(ether or ester-amide or ester) as manufactured by DuPont under the trade name Hytrel®, or Arkema under the trade name Pebax®.

Suitable flow modifiers like fatty acid salts or non-fatty acid salts can be incorporated in the polymer compositions in order to achieve higher neutralization levels such as 70 to 100 weight percent.

For the polymer blend compositions the hardness ranges from 30 Shore D to 70 Shore D, and the flex modulus ranges from to 10 to 80 kpsi.

Fatty acids are organic compounds containing 4 to 24 carbon atoms, having a hydrocarbon chain and a terminal carboxylic acid group. The hydrocarbon chain may be saturated, mono-unsaturated or monoenoic, and polyunsaturated or polyenoic. Dimers and trimers of the fatty acids can also be used in this embodiment of this invention.

Examples of saturated fatty acids are butyric (butanoic) acid, caproic (hexanoic) acid, caprylic (octanoic) acid, capric (decanoic) acid, lauric (dodecanoic) acid, myristic (tetradecanoic) acid, palmitic (hexadecanoic) acid, margaric (heptadecanoic) acid, stearic (octadecanoic) acid, arachidic (icosanoic) acid, behenic (docosanoic) acid, and lignoceric (tetracosanoic) acid.

Examples of monounsaturated fatty acids, or monoenoic fatty acids, are palmitoleic (cis-hexadec-9-enoic) acid, petroselinic (cis-octadec-6-enoic) acid, oleic (cis-octadec-9-enoic) acid, elaidic (trans-octadec-9-enoic) acid, cis-vaccenic (cis-octadec-11-enoic) acid, trans-vaccenic (trans-octadec-11-enoic) acid, gadoleic (cis-icos-9-enoic) acid, gondoic (cis-icos-11-enoic) acid, erucic (cis-docos-13-enoic) acid, and nervonic (cis-tetracos-15-enoic acid).

Examples of polyunsaturated fatty acids, or polyenoic fatty acids, are linoleic (cis,cis-octadeca-9,12-dienoi) acid, .gamma.-linolenic (all-cis-octadeca-6,9,12-trienoic) acid, .alpha.-linolenic (all-cis-octadeca-9,12,15-trienoic) acid, stearidonic (all-cis-octadeca-6,9,12,15-tetraenoic) acid, dihomo-.gamma.-linolenic (all-cis-icosa-8,11,14-trienoic) acid, arachidonic (all-cis-icosa-5,8,11,14-tetraenoic) acid, timnodonic (all-cis-icosa-5,8,11,14,17-pentaenoic) acid, and clupandonic (all-cis-docosa-4,7,10,13,16,19-hexaenoic) acid.

In one embodiment of the invention, the fatty acids are caprylic acid, capric acid, stearic acid, and oleic acid, and their dimers, trimers and mixtures thereof. In another embodiment of the invention, the fatty acids are oleic acid, and its dimer, trimer and mixtures thereof.

In one embodiment of this invention, the polymer compositions are neutralized first with a metal cation, such as barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof, before blending with a fatty acid or a salt of a fatty acid such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In one embodiment, the metal cation, the fatty acid or salt thereof are present in an amount sufficient to neutralize the ionomers by at least about 80%. In another embodiment, the metal cation, the fatty acid or salt thereof are present in an amount sufficient to neutralize the ionomers by about 90 to about 100%. In another embodiment, the metal cation, the fatty acid or salt thereof are present in an amount sufficient to neutralize the ionomers by about 100%.

In another embodiment of this invention, the polymer compositions are neutralized using a suitable cation source in the presence of a salt of a fatty acid, such as barium, lithium, sodium, zinc, bismuth, chromium, cobalt, copper, potassium, strontium, titanium, tungsten, magnesium, cesium, iron, nickel, silver, aluminum, tin, calcium, and manganese, as well as mixtures thereof. In one embodiment, the salt of the fatty acid is present in an amount sufficient to neutralize the ionomers by at least about 80%. In another embodiment, the salt of the fatty acid is present in an amount sufficient to neutralize the ionomers by about 90 to about 100%. In another embodiment, the salt of the fatty acid is present in an amount sufficient to neutralize the ionomers by about 100%.

In another embodiment, the polymer compositions are neutralized by a mixture of the process of (a) using a metal cation, before blending with a fatty acid or salt thereof, and (b) using only a salt of a fatty acid. In this embodiment, the metal cation, fatty acid or salt thereof are present in an amount sufficient to neutralize the ionomers by at least about 80%. In another embodiment, the cation, the fatty acid or salt thereof are present in an amount sufficient to neutralize the ionomers by about 90 to about 100%. In another embodiment, the cation, the fatty acid, or salt thereof are present in an amount sufficient to neutralize the ionomers by about 100%.

If the PDMS materials may be used alone or in blends with conventional polybutadiene rubber thermoset materials as a single or dual core, as well as blends with many conventional thermoplastic or thermoset materials in a multi-piece core. A preferred use of the PDMS materials of the present invention are blends with polyurethanes, polyurethane-ureas, polyurea-urethanes, polyureas, polyurethane-ionomers, epoxies, silicones, and unsaturated polyesters as inner or outer cover materials. These layers may be formed in a variety of methods, however preferably they are applied (i.e., sprayed, dipped, etc.) or molded using reaction injection molding, casting, laminating, or otherwise forming a thermoplastic or preferably thermoset layer of polymer from liquid reactive components. The PDMS materials may also be blended with thermoplastic composites wherein the thermoplastic materials comprise ionomers, polyurethanes, polyurethane-ureas, polyurea-urethanes, polyureas, metallocenes (including grafted metallocenes), polyamides, PEBAX®, HYTREL®, and other suitable materials, such as those described in U.S. Pat. Nos. 6,149,535 and 6,152,834, which are incorporated herein, in their entirety, by express reference thereto.

Suitable polyurethane-type materials for blending with the PDMS materials of the present invention or which by any cover layer, preferably outer cover layers may be formed if not blended with the hybrid materials include, but are not limited to, polyurethanes, polyurethane-ureas, polyurea-urethanes, polyureas, or epoxies, that generally comprise the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("H.sub.12MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Preferably, the polyisocyanate includes MDI, PPDI, TDI, or a mixture thereof. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The polyisocyanate should have less than about 14% unreacted NCO groups. Preferably, the at least one polyisocyanate has no greater than about 7.5% NCO, and more preferably, less than about 7.0%. It is well understood in the art that the hardness of polyurethane can be correlated to the percent of unreacted NCO groups.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes a polyether polyol, such as polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups.

Polyamine curatives are also suitable for use in polyurethane covers. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE®. 300, commercially available from Albermarle Corporation of Baton Rouge, La. Suitable polyamine curatives include both primary and secondary amines.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)-ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; and mixtures thereof. Preferred hydroxy-terminated curatives include 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}-benzene; 1,4-butanediol, and mixtures thereof.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a particularly preferred embodiment of the present invention, saturated (aliphatic) polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. In one embodiment, the saturated polyurethanes are substantially free of aromatic groups or moieties.

Saturated diisocyanates which can be used include, but are not limited to, ethylene diisocyanate; propylene-1,2-diisocyanate; tetramethylene-1,4-diisocyanate; 1,6-hexamethylene-diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate and isophorone diisocyanate ("IPDI").

Saturated polyols which are appropriate for use in this invention include, but are not limited to, polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol initiated polycaprolactone, 1,4-butanediol initiated polycaprolactone, 1,6-hexanediol initiated polycaprolactone; trimethylol propane initiated polycaprolactone, neopentyl glycol initiated polycaprolactone, PTMEG-initiated polycaprolactone. The most preferred saturated polyols are PTMEG and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyl-dimethylol, isomers and mixtures of isomers of cyclohexane bis(methylamine); triisopropanolamine, ethylene diamine, diethylene triamine, triethylene tetramine, tetraethylene pentamine, 4,4'-dicyclohexylmethane diamine, 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine, hexamethylene diamine, propylene diamine, 1-methyl-2,4-cyclohexyl diamine, 1-methyl-2,6-cyclohexyl diamine, 1,3-diaminopropane, dimethylamino propylamine, diethylamino propylamine, imido-bispropylamine, isomers and mixtures of isomers of diaminocyclohexane, monoethanolamine, diethanolamine, triethanolamine, monoisopropanolamine, and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

It is well known in the art that if the saturated polyurethane materials are to be blended with other thermoplastics, care must be taken in the formulation process so as to produce an end product which is thermoplastic in nature. Thermoplastic materials may be blended with other thermoplastic materials, but thermosetting materials are difficult if not impossible to blend homogeneously after the thermosetting materials are formed. Preferably, the saturated polyurethane comprises from about 1 to about 100%, more preferably from about 10 to about 75% of the cover composition and/or the intermediate layer composition. About 10 to about 90%, more preferably from about 25 to about 90% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance. Other suitable thermoplastic polyurethane resins include those disclosed in U.S. Pat. No. 6,235,830, which is incorporated herein, in its entirety, by express reference thereto.

The cores may be formed of conventional materials. The cores are substantially solid and form a center of a golf ball. The cores may also contain a liquid-, gas-, of gel-filled center. The cores of the present invention are surrounded by a single-layer or multiple-layer core or cover layers and are, optionally, painted, especially when a non-aliphatic or non-saturated polyurethane cover is employed. The balls may also include intermediate layers of molded or wound material as known by those of ordinary skill in the art. The present invention is therefore not limited to incorporating the cores into any particular golf ball construction and the present cores can be used in any constructions.

The materials for solid cores include compositions having a base rubber, a cross-linking agent, a filler, and a co-cross-linking or initiator agent, and preferably, a halogenated organosulfur compound. The base rubber typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. Examples of desirable polybutadiene rubbers include BUNA® CB22 and BUNA®CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

The cross-linking agent includes a metal salt, such as a zinc salt or a magnesium unsaturated fatty acid, such as acrylic or methacrylic acid, having 3 to 8 carbon atoms. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The cross-linking agent is typically present in an amount greater than about 10 parts per hundred ("pph")

parts of the base polymer, preferably from about 20 to 40 pph of the base polymer, more preferably from about 25 to 35 pph of the base polymer.

The initiator agent can be any known polymerization initiator which decomposes during the cure cycle. Suitable initiators include organic peroxide compounds, such as dicumyl peroxide; 1,1-di(t-butylperoxy) 3,3,5-trimethyl cyclohexane; alpha.,.alpha.-bis (t-butylperoxy) diisopropylbenzene; 2,5-dimethyl-2,5di(t-butylperoxy) hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent (at the same percent active oxygen content) to 4 pph of a concentrate peroxide that is 50% active (i.e., 2 divided by 0.5=4).

Fillers typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers may be added to one or more portions of the golf ball and typically may include processing aids or compounds to affect rheological and mixing properties, density-modifying fillers, fillers to improve tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The invention also includes, if desired, a method to convert the cis-isomer of the polybutadiene resilient polymer component to the trans-isomer during a molding cycle and to form a golf ball. A variety of methods and materials suitable for cis-to-trans conversion have been disclosed in U.S. Pat. No. 6,162,135, U.S. Pat. No. 6,455,578, U.S. Pat. No. 6,291,592, and U.S. Pat. No. 6,458,895, each of which are incorporated herein, in their entirety, by reference.

The materials used in forming either the golf ball center or any portion of the core, in accordance with the invention, may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder.

Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a fixed time duration. The molding cycle may also include a two-step process, in which the polymer mixture is held in the mold at an initial temperature for an initial duration of time, followed by holding at a second, typically higher temperature for a second duration of time. In a preferred embodiment of the current invention, a single-step cure cycle is employed. The materials used in forming either the golf ball center or any portion of the core, in accordance with the invention, may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The golf ball layers of the present invention can likewise include one or more homopolymeric or copolymeric materials, such as: (1) Vinyl resins, such as those formed by the polymerization of vinyl chloride, or by the copolymerization of vinyl chloride with vinyl acetate, acrylic esters or vinylidene chloride; (2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst; (3) Polyurethanes, such as those prepared from polyols and diisocyanates or polyisocyanates and those disclosed in U.S. Pat. No. 5,334,673; (4) Polyureas, such as those disclosed in U.S. Pat. No. 5,484,870; (5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethyl-propylene-non-conjugated diene terpolymer, and the like; (6) Acrylic resins and blends of these resins with poly vinyl chloride, elastomers, and the like; (7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.; (8) Polyphenylene oxide resins or blends of polyphenylene oxide with high impact polystyrene as sold under the trademark NORYL® by General Electric Company of Pittsfield, Mass.; (9) Thermoplastic polyesters, such as polyethylene terephthalate, polybutylene terephthalate, polyethylene terephthalate/glycol modified and elastomers sold under the trademarks HYTREL® by E.I. DuPont de Nemours & Co. of Wilmington, Del., and LOMOD® by General Electric Company of Pittsburgh, Mass.; (10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and (11) Blends of thermoplastic rubbers with polyethylene, propylene, polyacetal, nylon, polyesters, cellulose esters, and the like.

Any of the cover layers can include polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional co-monomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. Preferably, the acrylic or methacrylic acid is present in about 8 to 35 weight percent, more preferably 8 to 25 weight percent, and most preferably 8 to 20 weight percent.

Any of the inner or outer cover layers may also be formed from polymers containing .alpha.,.beta.-unsaturated carboxylic acid groups, or the salts thereof, that have been 100 percent neutralized by organic fatty acids. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers can be described as E/X/Y copolymers where E is ethylene, X is an .alpha.,.beta.-ethylenically unsaturated carboxylic acid, and Y is a softening comonomer. In a preferred embodiment, X is acrylic or methacrylic acid and Y is a C.sub.1-8 alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copoly-esteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyurea-urethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

A variety of conventional components can be added to the cover compositions of the present invention. These include, but are not limited to, white pigment such as $TiO_2$ ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers to any of the above compositions and, in particular, the polyurethane compositions, help to maintain the tensile strength, elongation, and color stability. Suitable UV absorbers and light stabilizers include TINUVIN®328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety in the present application.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 and U.S. Pat. No. 5,334,673 both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

The resultant golf balls typically have a coefficient of restitution of greater than about 0.7, preferably greater than about 0.75, and more preferably greater than about 0.78. The golf balls also typically have an Atti compression of at least about 30, preferably from about 50 to 120, and more preferably from about 60 to 100.

When golf balls are prepared according to the invention, they typically will have dimple coverage greater than about 60 percent, preferably greater than about 65 percent, and more preferably greater than about 75 percent. The flexural modulus of the cover material used on the golf balls, as measured by ASTM method D6272 98, Procedure B, is typically greater than about 10 kpsi, and is preferably from about 10 kpsi to 150 kpsi, more preferably 15 to 70 kpsi. As discussed herein, the outer cover layer is preferably formed from a relatively soft polyurethane material. In particular, the material of the outer cover layer should have a material hardness, as measured by ASTM-D2240, less than about 70 Shore D, more preferably between about 25 and about 50 Shore D, and most preferably between about 40 and about 48 Shore D. The inner cover layer preferably has a material hardness of less than about 70 Shore D, more preferably between about 20 and about 70 Shore D, and most preferably, between about 25 and about 65 Shore D.

The core of the present invention has an Atti compression of less than about 120, more preferably, between about 20 and about 100, and most preferably, between about 40 and about 80. In an alternative, low compression embodiment, the core has an Atti compression less than about 20.

The overall outer diameter ("OD") of the core is less than about 1.650 inches, preferably, no greater than 1.620 inches, more preferably between about 1.000 and about 1.510 inches, and most preferably between about 1.510 inches to about 1.61 inches. The OD of the inner cover layer is preferably between 1.580 inches and about 1.650 inches, more preferably between about 1.590 inches to about 1.630 inches, and most preferably between about 1.600 inches to about 1.630 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

Accordingly, it is preferable that the golf balls of the present invention have an intermediate layer with a flexural modulus of about 500 psi to about 500,000 psi according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 67 Shore D, the cover layer preferably has a flexural modulus of about 55,000 psi to about 70,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater. In still another embodiment, the specific gravity of the intermediate layer or cover is about 1.0 to about 1.3.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising a core and at least one outer layer, wherein the outer layer is formed from a composition comprising a poly(dimethyl siloxane) ionomer consisting of repeating siloxane units, wherein the poly(dimethy siloxane) ionomer is made by the steps of:

polycondensating hydroxyl terminated poly(dimethyl siloxane) chains with a dicholoro silane compound containing a tert-butyl group;

cleaving of a tert-butyl group using triflic acid catalyst; and neutralizing the acid moiety in the polymer either partially or fully with a suitable metal salt selected from the group consisting of lithium hydroxide, sodium hydroxide, zinc acetate or magnesium oxide and molding into the outer layer of a golf ball.

2. The golf ball according to claim 1, wherein the polymer has an acid content from 5 to 50 weight percent.

3. The golf ball according to claim 1, wherein the triflic acid catalyst content is from 2 to 3 micro-liter per 10 grams of the polymer.

4. The golf ball according to claim 1, wherein flow modifiers are incorporated into the polymer composition and the composition has a neutralization level of 70 to 100 percent.

5. The golf ball according to claim 4, wherein the flow modifier is a salt of a fatty acid selected from a group consisting of butyric acid, caproic acid, caprylic acid, capric acid, lauric acid, myristic acid, palmitic acid, margaric acid, stearic acid, arachidic acid, behenic acid, lignoceric acid, palmitoleic acid, petroselinic acid, oleic acid, elaidic acid, cis-vaccenic acid, trans-vaccenic acid, gadoleic acid, gondoic acid, erucic acid, nervonic acid, linoleic acid, .gamma.-linolenic acid, .alpha.-linolenic acid, stearidonic acid, dihomo-.gamma.-linolenic acid, arachidonic acid, timnodonic acid, clupandonic acid, dimers, trimers and mixtures thereof.

6. The golf ball according to claim 1, wherein the neutralizing of the acid in the polymer with an inorganic metal cation selected from a group consisting of barium, lithium, sodium, zinc, bismuth, chromium, cobalt, copper, potassium, strontium, titanium, tungsten, magnesium, cesium, iron, nickel, silver, aluminum, tin, calcium, manganese and mixtures thereof.

7. The golf ball according to claim 1, wherein the at least one outer layer comprises an outer core layer and a cover.

8. The golf ball according to claim 1, wherein the at least one outer layer comprises an outer core layer, an intermediate layer and a cover.

9. The golf ball according to claim 1, wherein the at least one outer layer comprises an outer core layer, an intermediate layer, an inner cover layer, and a cover.

10. The golf ball according to claim 1, wherein the at least one outer layer comprises an inner cover layer and a cover.

11. The golf ball of claim 1, wherein the core has an outer diameter of at least about 1.51 inches.

12. The golf ball of claim 11, wherein the core has an outer diameter of between about 1.57 inches and about 1.62 inches.

13. The golf ball of claim 1, wherein the at least one outer layer that is formed from poly(dimethy siloxane) ionomer has a hardness between 30 to 70 Shore D.

14. The golf ball of claim 1, wherein the at least one outer layer that is formed from poly(dimethy siloxane) ionomer has a flexural modulus between 10 to 80 kpsi.

* * * * *